(No Model.)
J. N. PRINGLE.
MUSICAL SKIPPING ROPE HANDLE.
No. 438,489. Patented Oct. 14, 1890.
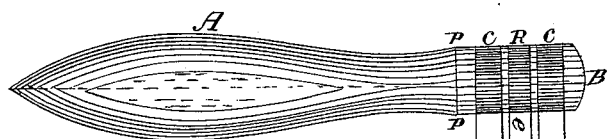
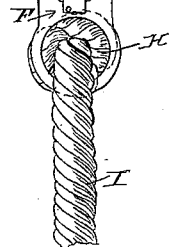
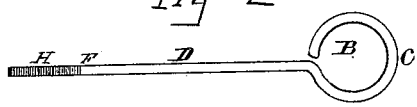
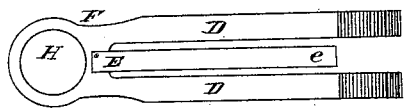
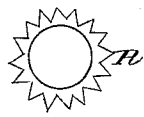
Witnesses
F. L. Fellowes
Henry Pringle
Inventor
John Nelson Pringle

UNITED STATES PATENT OFFICE.

JOHN NELSON PRINGLE, OF BELLEVILLE, CANADA.

MUSICAL SKIPPING-ROPE HANDLE.

SPECIFICATION forming part of Letters Patent No. 438,489, dated October 14, 1890.

Application filed June 17, 1889. Serial No. 314,541. (No model.) Patented in Canada May 17, 1889, No. 31,379.

*To all whom it may concern:*

Be it known that I, JOHN NELSON PRINGLE, a citizen of Canada, residing at Belleville, in the county of Hastings and Province of Ontario, Canada, have invented certain new and useful Improvements in Skipping-Rope Handles, (for which I have received Letters Patent in Canada, No. 31,379, dated May 17, 1889;) and I do hereby declare that the following is a full, clear, and exact description of the invention, which will enable others skilled in the art to which it appertains to make and use the same.

My invention is an improvement in skipping-rope handles, and particularly in that class of such devices in which the handle has a cogged or toothed wheel, and a bar swings on such handle, is connected with the end of the rope, and has a spring-tongue for engaging the toothed wheel, so that as said bar revolves around the handle its spring-tongue will, by engaging the teeth of the wheel, produce a rattling sound, as is well understood.

My invention aims to so improve the handle that the weight and strain of the rope will be exerted uniformly on opposite sides of the toothed wheel and equally on opposite sides of the line of such rope, so that there will be no twisting or binding of the swinging bar on the handle-bar.

The invention consists in the particular construction and combination of parts, as will be hereinafter more particularly pointed out and claimed.

In the drawings, Figure 1 is a side view of a handle provided with my improvements. Fig. 2 is an edge view of one of the swinging bars or frames. Fig. 3 is a side view of the toothed wheel. Fig. 4 is a face view of the swinging bar or frame.

The handle A may be of any suitable shape, being provided at one end with a portion adapted to receive the toothed wheel B and having on opposite sides of said wheel journals for the rings C on the arms D of the swinging bar F. The toothed wheel is slipped on the handle and secured in any suitable manner.

The bar or frame F has one end bifurcated, forming the arms D, and providing a slot which receives the toothed wheel and permits the motion of the free end of the spring E, the point of which is in position to engage and slip past the teeth of the wheel B, so the bar may swing or turn in either direction and will in either case produce a rattling noise, as desired.

At their free ends the arms D are bent to form the rings C, which fit around the handle on opposite sides of the toothed wheel, so that the frame or bar F may freely turn on said handle around the toothed wheel. At or near its swinging end the bar F is provided with an opening H for the rope I. The direction of this opening H with respect to the direction of motion of the bar D and the relation of such opening H to the toothed wheel and the journal-rings C is an important feature of my invention. The direction of the opening H, it will be seen, is in line with the arc of movement of the outer end of the bar, or, in other words, at right angles and tangential to the axis of the handle, so that the weight and drag on said rope as it is turned in the act of skipping are exerted squarely on the journals of the handle, so that there will be no twisting on the journals to retard the motion or to produce undue wear upon the parts. This opening H is also arranged in a line between the directions of length of the arms D, and the spring E is secured at one end to the bar D immediately above the opening H. By the particular arrangement of said opening H with respect to the point of connection of the arms D with the handle, I avoid any twisting strains on the handle and so render the operation of the device smoother and easier.

It will be understood that I do not claim a skipping-rope handle in which the swinging arm is pivoted or journaled on a handle and has at its outer end a rope-opening which is formed in a line parallel to the axis in which such arm swings, as in such construction the strain on the rope tends to twist the arm on its axis and cause it to bind thereon and be thereby impeded from free turning, as is desired; but in my improved device the opening for the rope is formed in a direction at right angles to the axis of the handle-bar and tangential or parallel to the tangent of the circle described by the swinging bar or frame, as such construction and arrangement avoid any side draft on the swinging bar or frame and permit the same to swing freely on the handle-bar.

Having thus described my invention, what I claim as new is—

As an improved article of manufacture, the herein-described skipping-rope handle, consisting of the handle-bar, the toothed wheel rigid thereon, the swinging arm or frame having a tongue to engage the toothed wheel and formed of a flat plate of metal slotted from one end to form arms which are bent around the handle-bar on opposite sides of the toothed wheel, forming journals by which the frame or arm can turn on the handle-bar, and whereby the said swinging frame can be stamped out of a plate of metal and can be applied to the handle-bar when the toothed wheel is fast thereon, such swinging frame being provided near its outer end with an opening adapted for the passage of the rope, which opening is formed in a line between the arms of the said frame or bar and in a direction at right angles to the axis of the handle-bar and tangential or parallel to the tangent of the circle described by the swinging bar or frame, whereby the drag of the rope attached to the frame or arm will not tend to twist the frame or arm on the handle-bar, all substantially as and for the purposes set forth.

JOHN NELSON PRINGLE.

Witnesses:
F. L. FELLOWES,
HENRY PRINGLE.